US007269984B2

(12) United States Patent
Jackson

(10) Patent No.: US 7,269,984 B2
(45) Date of Patent: Sep. 18, 2007

(54) RATCHETING PAWL LATCH

(75) Inventor: Joe Jackson, Wilmington, DE (US)

(73) Assignee: Southco, Inc., Concordville, PA (US)

( * ) Notice: Subject to any disclaimer, the term of this patent is extended or adjusted under 35 U.S.C. 154(b) by 221 days.

(21) Appl. No.: 10/903,783

(22) Filed: Jul. 31, 2004

(65) Prior Publication Data

US 2006/0021400 A1 Feb. 2, 2006

(51) Int. Cl.
*B60R 25/02* (2006.01)

(52) U.S. Cl. .......................... 70/210; 70/208; 292/216; 292/DIG. 31

(58) Field of Classification Search .......... 70/208–210; 292/DIG. 31, 336.2, 173, 216
See application file for complete search history.

(56) References Cited

U.S. PATENT DOCUMENTS

| | | | | |
|---|---|---|---|---|
| 4,312,205 | A * | 1/1982 | Reed et al. | 70/472 |
| 4,320,642 | A * | 3/1982 | Pastva, Jr. | 70/472 |
| 4,321,812 | A * | 3/1982 | Pelcin | 70/472 |
| 4,335,595 | A * | 6/1982 | Swan et al. | 70/149 |
| 4,438,964 | A * | 3/1984 | Peters | 292/216 |
| 4,683,736 | A * | 8/1987 | Weinerman et al. | 70/208 |
| 4,850,208 | A | 7/1989 | Weinerman et al. | 70/208 |
| 5,046,340 | A | 9/1991 | Weinerman et al. | 70/208 |
| 5,098,141 | A | 3/1992 | Bull | 292/252 |
| 5,127,686 | A | 7/1992 | Gleason et al. | 292/216 |
| 5,234,238 | A | 8/1993 | Takimoto | 292/216 |
| 5,292,159 | A | 3/1994 | Sandhu et al. | 292/173 |
| 5,927,772 | A | 7/1999 | Antonucci et al. | 292/336.3 |
| 5,927,773 | A | 7/1999 | Larsen et al. | 292/337 |
| 5,941,104 | A * | 8/1999 | Sadler | 70/208 |
| 6,048,006 | A | 4/2000 | Antonucci et al. | 292/336.3 |
| 6,145,352 | A * | 11/2000 | Vickers et al. | 70/208 |
| 2005/0115289 | A1* | 6/2005 | Talukdar et al. | 70/208 |

* cited by examiner

*Primary Examiner*—Suzanne Dino Barrett
(74) *Attorney, Agent, or Firm*—Paul & Paul

(57) ABSTRACT

A latch for securing together two members such as a frame member to which the latch is connected and a door or panel which can swing into position and into a stop position when the door or panel member contacts a rotary pawl which is biased to the unlatched position. The latch has a trigger assembly which releases the rotary pawl from the latched position when the latch is unlocked and actuated.

17 Claims, 14 Drawing Sheets

RATCHETING PAWL LATCH

BACKGROUND OF THE INVENTION

The present invention relates to a latch for securing two members together. For example, the latch can secure the free end of a panel or door to a frame on which the latch is mounted. The latch can be repeatedly latched, unlatched and locked by a user who desires to fasten and unfasten the two members.

Various latches are known for securing two members together. Prior art latches also include latches having a pawl which is rotated 90 degrees such that the pawl is rotated out of the region in which a gate member is located when the gate member is placed in the closed position and engages a frame member to which the latch is attached. Such latches did not provide a means to limit movement of the gate member in the axis of the rotating movement of the gate member when the gate member is closed and the latch is engaged with the gate member.

Also, a need exists for a latch which is spring loaded and biased toward the open position such that the latch has the ability to force the door or panel open when a user actuates the handle.

SUMMARY OF THE INVENTION

The present invention is directed to a latch for securing together two members. In a preferred embodiment, as will be described herein, a latch is disclosed which fastens a door or panel member to a frame member to which the latch is attached.

In accordance with the present invention, it is an object to provide a latch for securing together two members.

It is another object of the present invention to provide a latch which can be attached to a frame member and can engage a striker on a door or panel member which is placed adjacent to the frame member.

It is still another object of the invention to provide a latch which has a trigger assembly which allows a user to open the latch upon actuation of a handle.

It is yet another object of the invention to provide a latch having a rotary pawl which has a ratcheting mechanism.

These and other objects of the present invention will be more readily apparent when taken into consideration with the following description and the attached drawings.

DETAILED DESCRIPTION OF THE INVENTION

Figure 3:
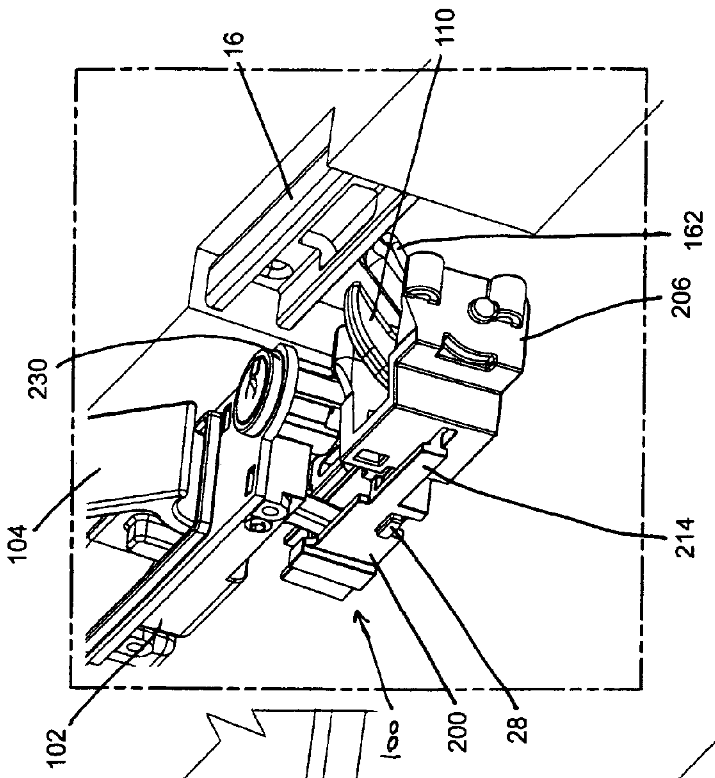
FIG. 3 is an enlarged detail view of a portion of FIG. 2.

Referring now to the drawings in detail, wherein like reference numerals indicate like elements through the several views, there is shown in FIGS. 1 to 8, perspective views of a preferred embodiment of a latch in accordance with the present invention. The latch 100 is shown attached to frame member 6. The present invention is directed to a latch 100 for use with closure members such as panels, drawers, doors, etc. Although the operation of the latch 100 will be described in the context of securing a member to a frame member which is attached to another panel of a vehicle, the latch of the present invention is widely applicable to many kinds of doors, windows, panels, and drawers. The latch 100 of the present invention releasably secures a first member, such as a door, window, panel, frame 6 or drawer, to a striker 16 on a second closure member 26, such as another door, window, panel, or drawer or a frame. The latch assembly 100 of the present invention includes a housing 102, a handle 104, a pawl torsion spring 162, handle actuator 98, trigger 200, lock slide 24, and a pawl 110.

Figure 8:
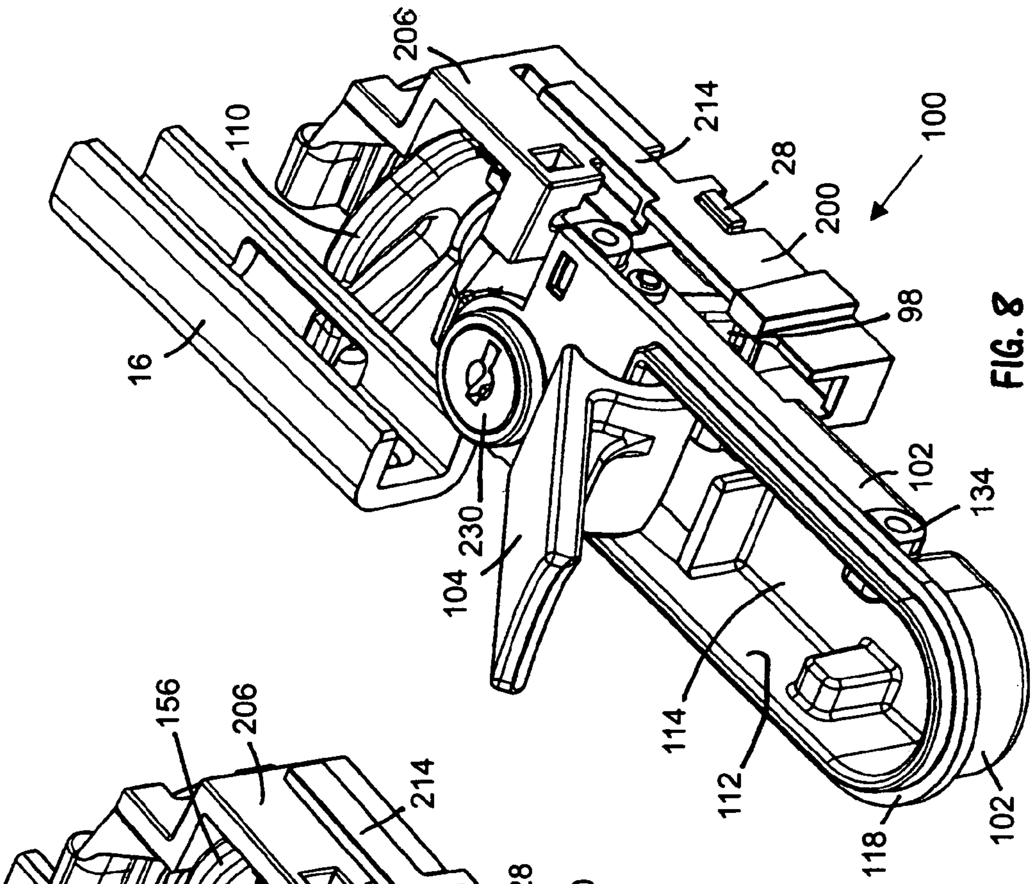
FIG. 8 is a perspective view of the latch of FIG. 1 in the unlatched and unlocked position shown with the rotary pawl having released the striker.
Figure 7:
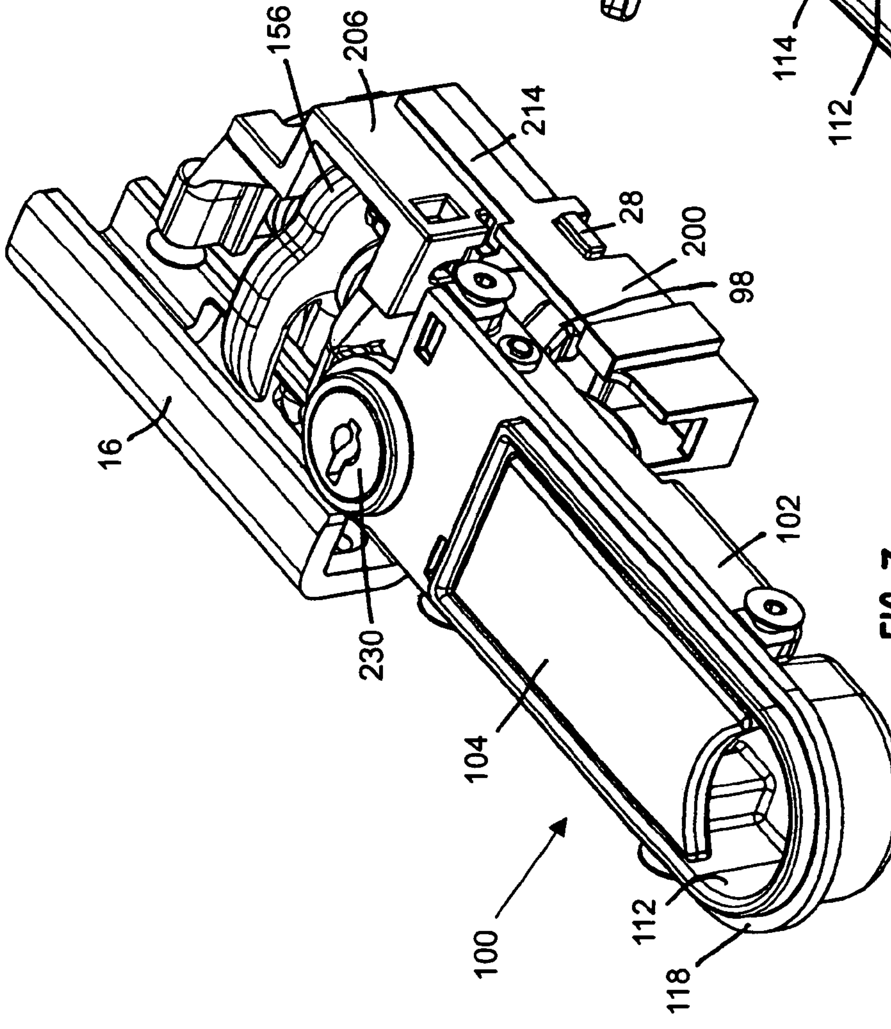
FIG. 7 is a perspective view of the latch of FIG. 1 in the latched and unlocked position shown with the rotary pawl engaged with the striker.
Figure 28:
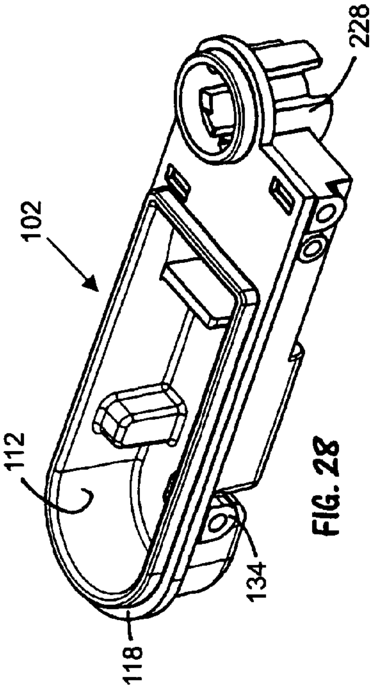
FIG. 28 is a perspective view of the latch housing of the latch of the present invention.
Figure 29:
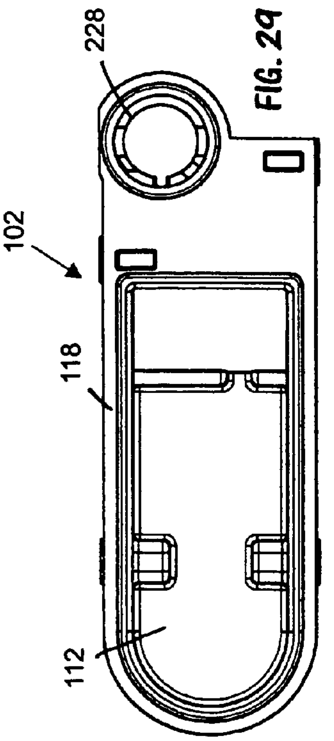
FIG. 29 is a top plan view of the latch housing of the latch of the present invention.
Figure 30:
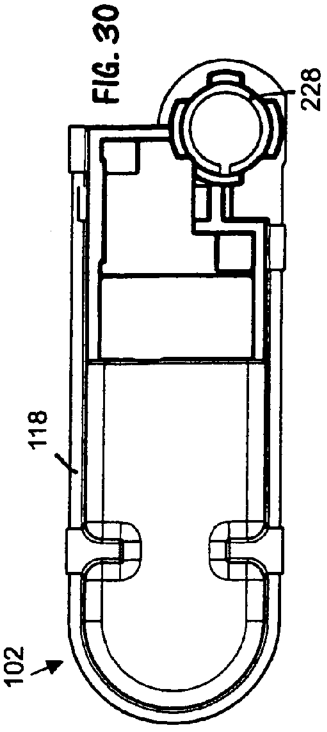
FIG. 30 is a bottom view of the latch housing of the latch of the present invention.
Figure 23:
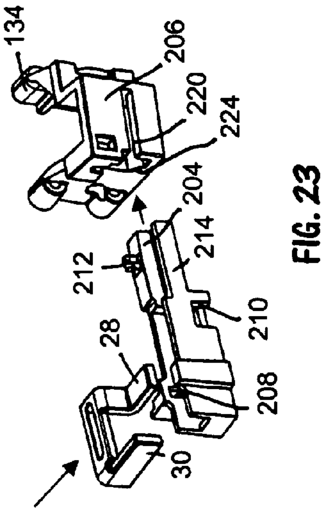
FIG. 23 is a an exploded view of the pawl housing, lock slide, and trigger of the latch of the present invention.

As seen in FIGS. 7, 8 and 28, the latch housing 102 has a cavity or depression 112 which receives the handle 104 when the handle is in the closed position shown in FIG. 7. The depression 112 has an essentially enclosed bottom 114 and is surrounded by a bezel or flange 118.

The pawl housing 206 houses the pawl 110 and pawl torsion spring 162. Cylindrical sleeves 134 project from the flange 118 and provides attachment holes, preferably screwholes for use in securing the latch to a frame or member. Referring to FIGS. 1 to 6, the housing 102 is installed in a frame by providing an opening in the frame. The housing 102 can then be secured to the panel using, for example, self-tapping screws which engage the sleeves from the underside of the panel.

Figure 26:
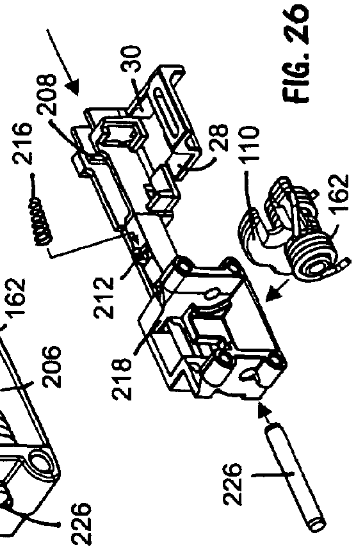
FIG. 26 is an exploded view of rotary pawl, torsion spring, lock slide, conical spring and trigger of the latch of the present invention.
Figure 31:
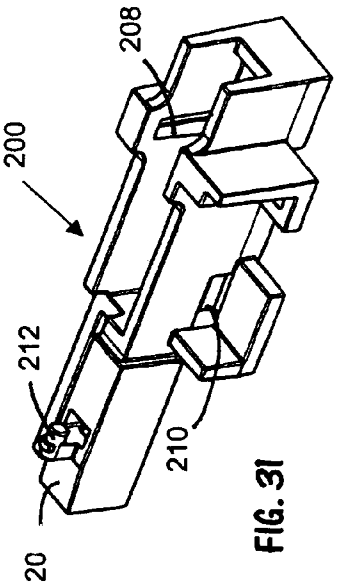
FIG. 31 is a perspective view of the trigger of the latch of the present invention.
Figure 32:
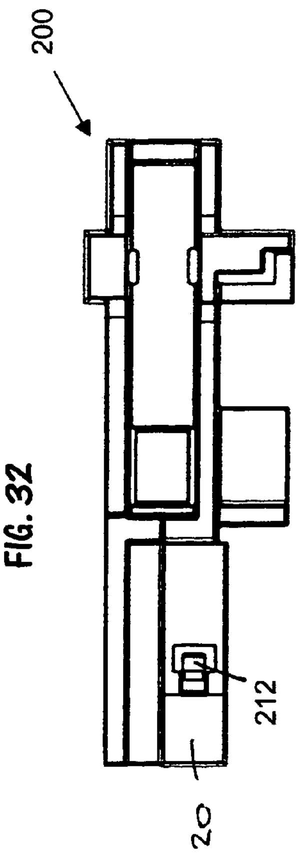
FIG. 32 is a top plan view of the trigger of the latch of the present invention.
Figure 33:
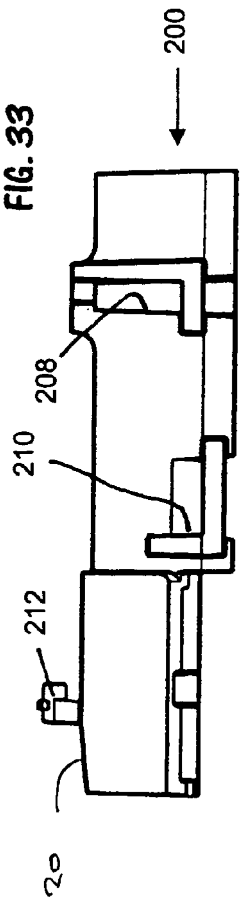
FIG. 33 is a side view of the trigger of the latch of the present invention.
Figure 43:
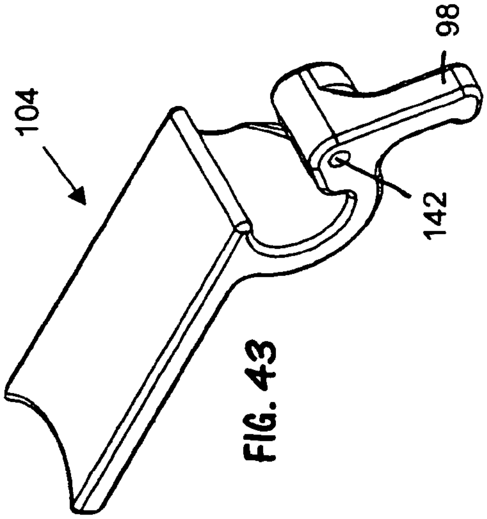
FIG. 43 is a perspective view of the handle of the latch of the present invention.
Figure 41:
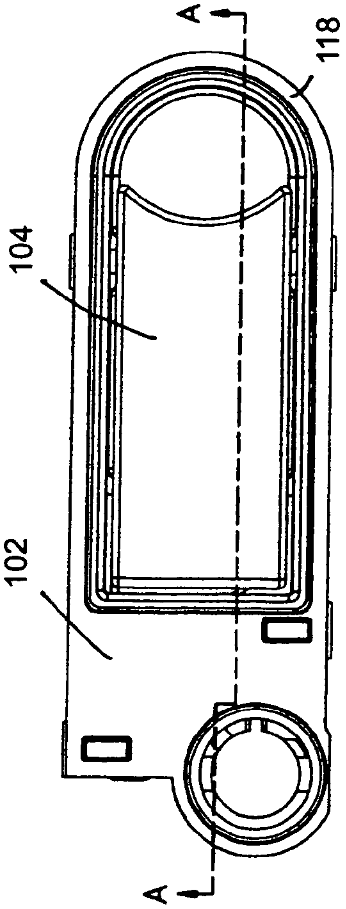
FIG. 41 is a top plan view of the view of the handle and latch housing of the latch of the present invention.
Figure 42:
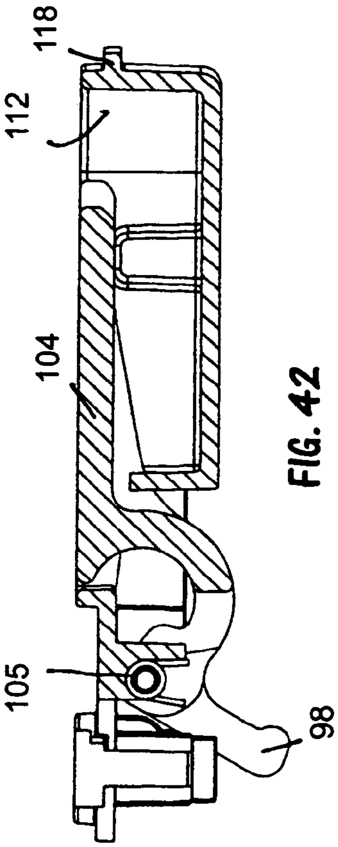
FIG. 42 is a side view partially in section along line A-A of FIG. 41 of the handle, handle spring and latch housing of the latch of the present invention.
Figure 45:
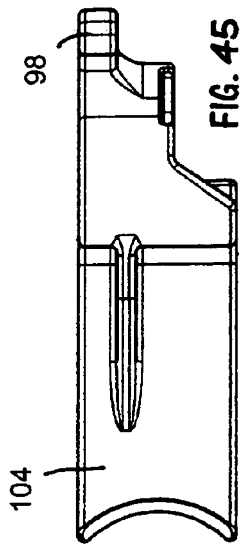
FIG. 45 is a bottom view of the handle of the latch of the present invention.
Figure 44:
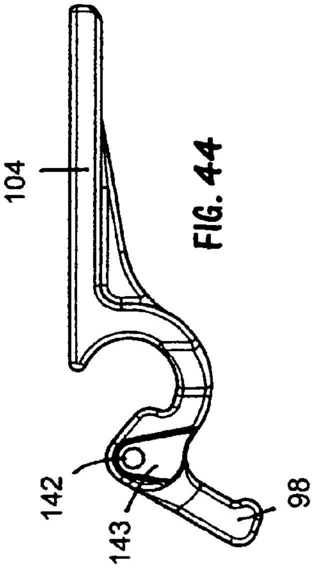
FIG. 44 is a side view of the handle of the latch of the present invention.

The handle 104 can be in the form of a paddle, as shown in FIGS. 7 and 8 to facilitate grasping of the handle by a user using fingers. The handle as seen in FIGS. 43 to 45 also has an opening 142 that extends to both sides of the handle. The opening 142 permits the installation of handle pin 42 into opening 142 as seen in FIG. 26 to pivotally attach the handle 104 to the housing 102. When the handle 104 is in the closed position, the handle is received in the cavity 112 such that the top of the handle 104 is flush with the flange 118. This feature gives the latch 100 a very low profile. The handle 104 must be lifted in order to move the handle 104 to the open position and place the latch in the unlatched position. The handle 104 is preferably sized to allow insertion of the fingers of the user's hand, which allows the handle 104 to be grasped and lifted by a user. As previously stated, the housing 102 is installed in an aperture in the first member or panel using any of several well-known fasteners.

Figure 1:
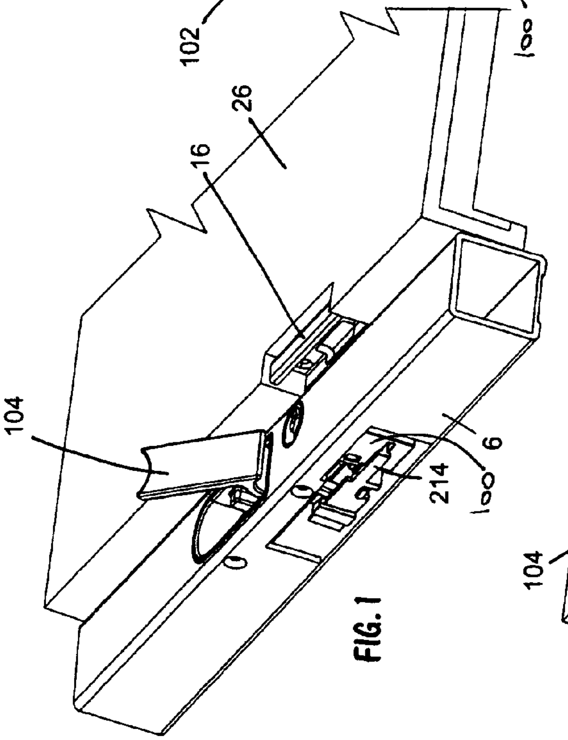
FIG. 1 is a perspective view of a preferred embodiment of a latch in accordance with the present invention with the latch in the unlatched and unlocked position showing a striker preparing to engage a rotary pawl.
Figure 2:
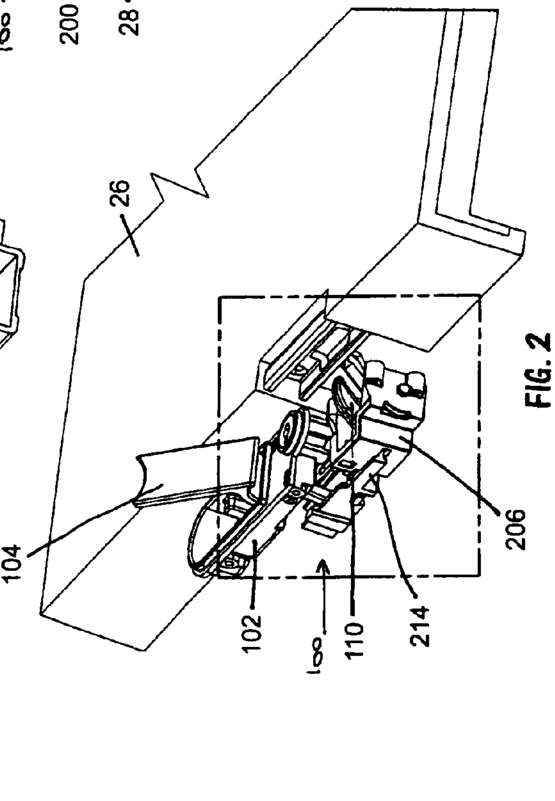
FIG. 2 is a perspective view of the latch of FIG. 1.
Figure 6:
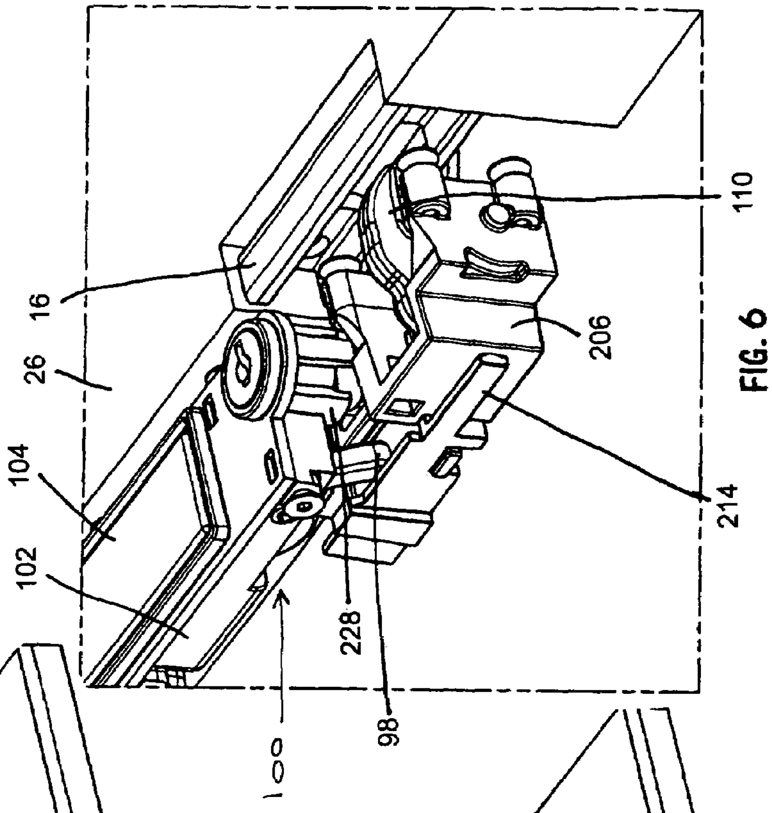
FIG. 6 is an enlarged detail view of a portion of FIG. 4 without the frame shown.
Figure 4:
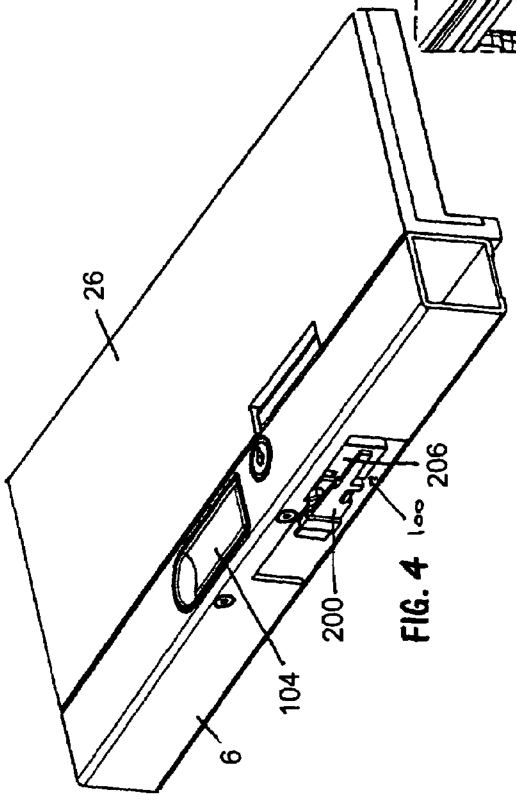
FIG. 4 is a perspective view of a preferred embodiment of a latch in accordance with the present invention with the latch in the latched and unlocked position showing a striker engaged with a rotary pawl.
Figure 5:
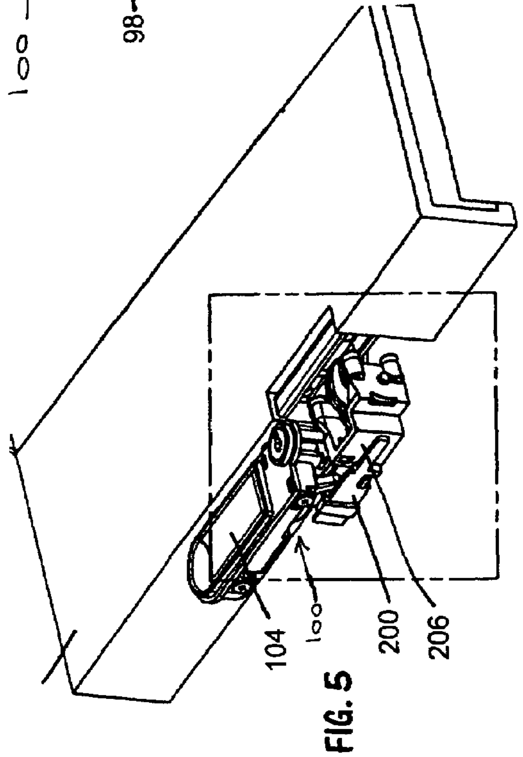
FIG. 5 is a perspective view of the latch of FIG. 4 without the frame shown.

The pawl housing 206 houses the pawl 110 and pawl spring 162 such that the pawl rotates in the receptacle 206 to the open or unlatched position due to the biasing force of the pawl torsion spring biasing the pawl 110. The extended or latched position of the pawl 110 is shown in FIGS. 4-6, while the unlatched position of the latch is shown in FIGS. 1-3.

Figure 24:
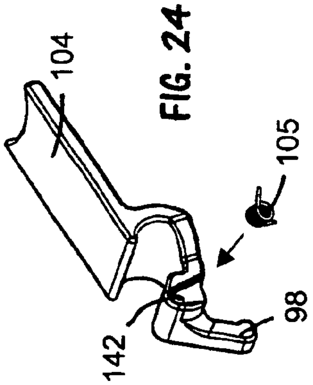
FIG. 24 is an exploded view of the handle of the present invention showing the location of the handle spring.
Figure 25:
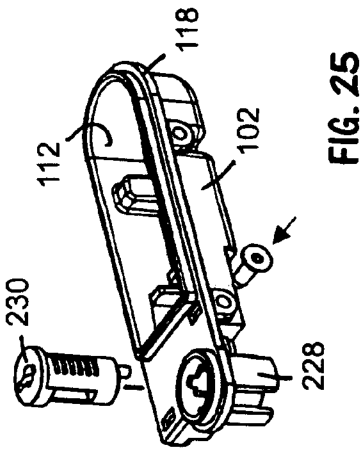
FIG. 25 is an exploded view of the housing and lock plug of the present invention showing a screw being inserted into the housing.
Figure 20:
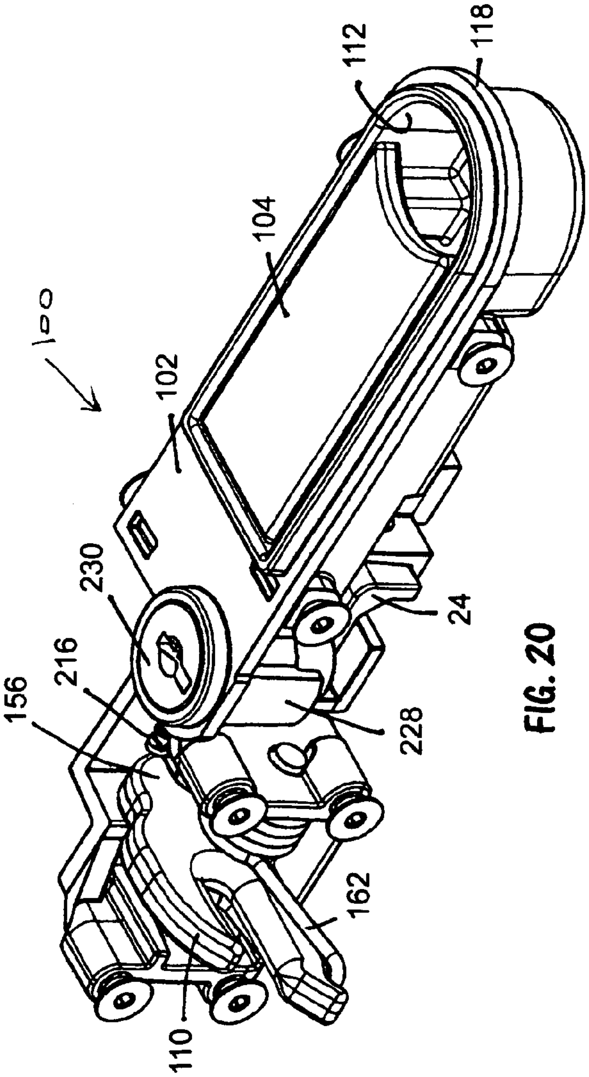
FIG. 20 is a perspection view of the left side of the latch of FIG. 19.
Figure 51:
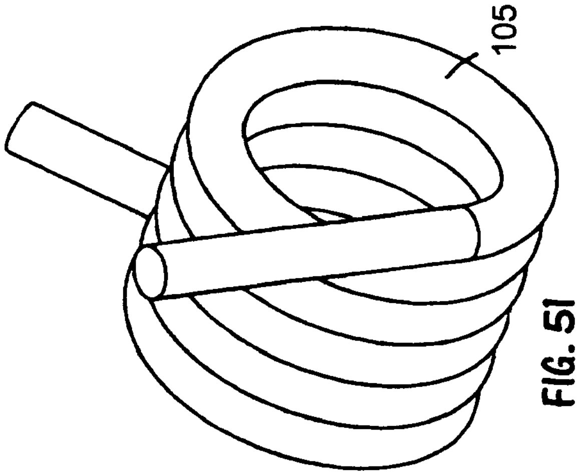
FIG. 51 is a perspective view of the handle spring for the latch of the present invention.

The handle 104 is pivotally supported by the housing 102 and has handle actuator 98 which extends into the interior of the latch housing 102. In addition, the handle 104 is biased, preferably by a torsion spring 105 to the closed position which is placed in handle spring indent 143, as seen in the exploded view shown in FIG. 24, FIG. 44 and FIG. 51.

Figure 48:
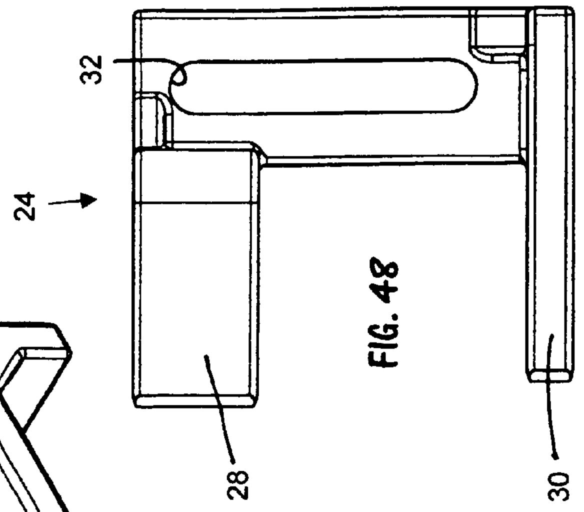
FIG. 48 is a bottom view of the lock slide of the latch of the present invention.
Figure 46:
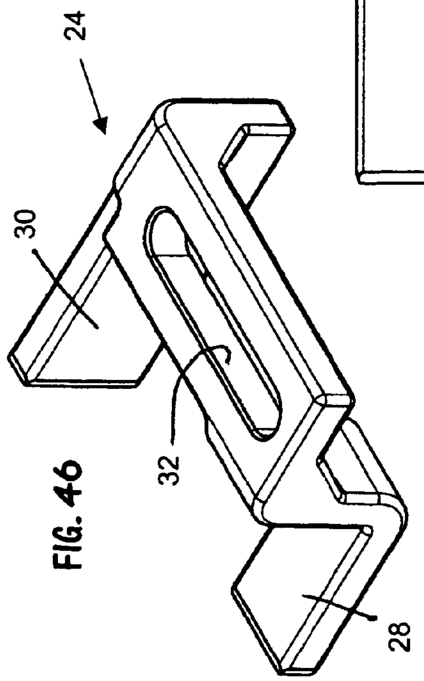
FIG. 46 is a perspective view of the lock slide of the latch of the present invention.
Figure 47:
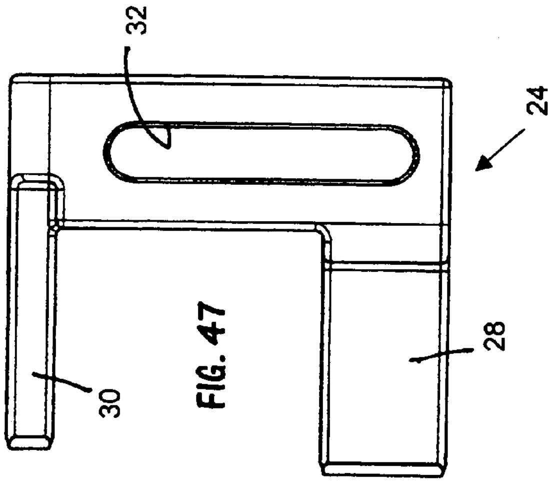
FIG. 47 is a top plan view of the lock slide of the latch of the present invention.

Lock slide 24 as seen in FIGS. 46 to 48, has lock slide slot 32, which extends across at least a portion of a major dimension of the lock slide 24. Lock slide guide 28 and lock slide trigger actuator 30 extend to one side of lock slide 24.

Figure 12:
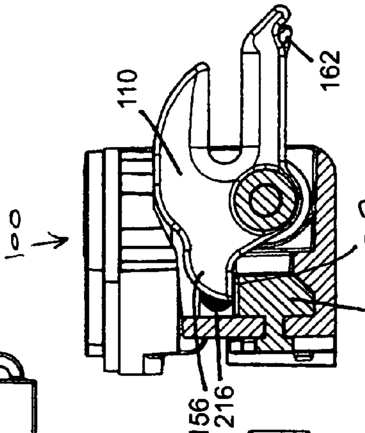
FIG. 12 is an elevational view partially in section of the front of the latch of FIG. 9 in the latched and unlocked position.
Figure 10:
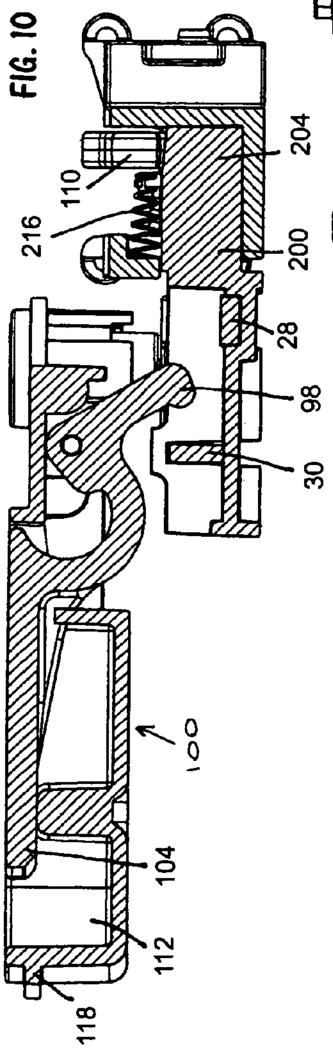
FIG. 10 is a sectional view of the latch of FIG. 9 taken along line A-A of FIG. 9 in the latched and unlocked position.
Figure 9:
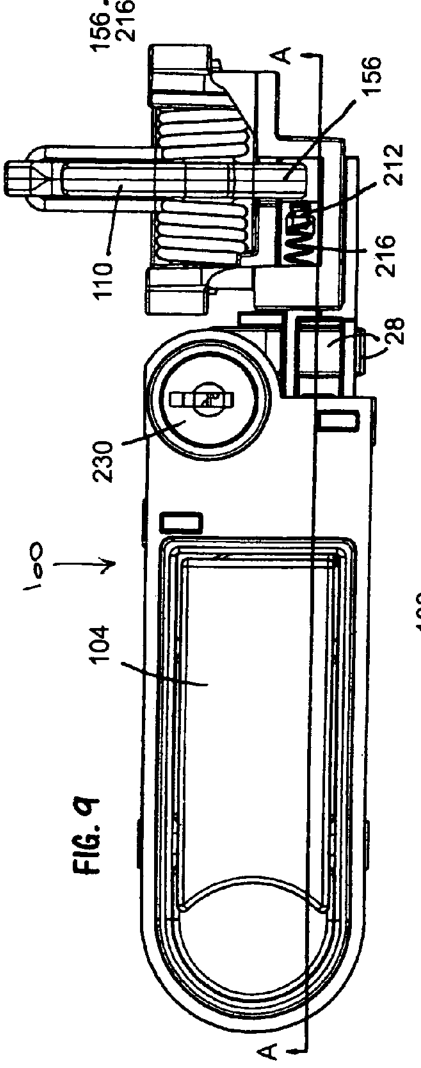
FIG. 9 is a top plan view of the latch of the present invention in the latched and unlocked position.
Figure 11:
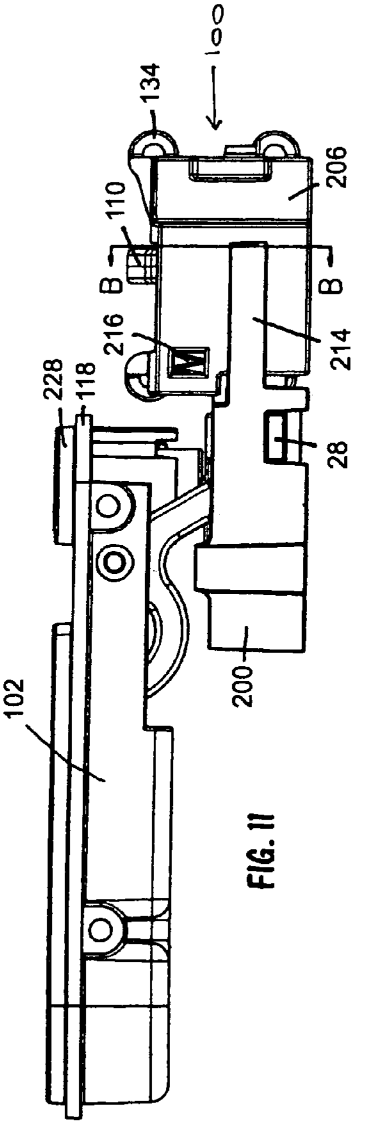
FIG. 11 is a side elevational view of the latch of FIG. 9 in the latched and unlocked position.
Figure 16:
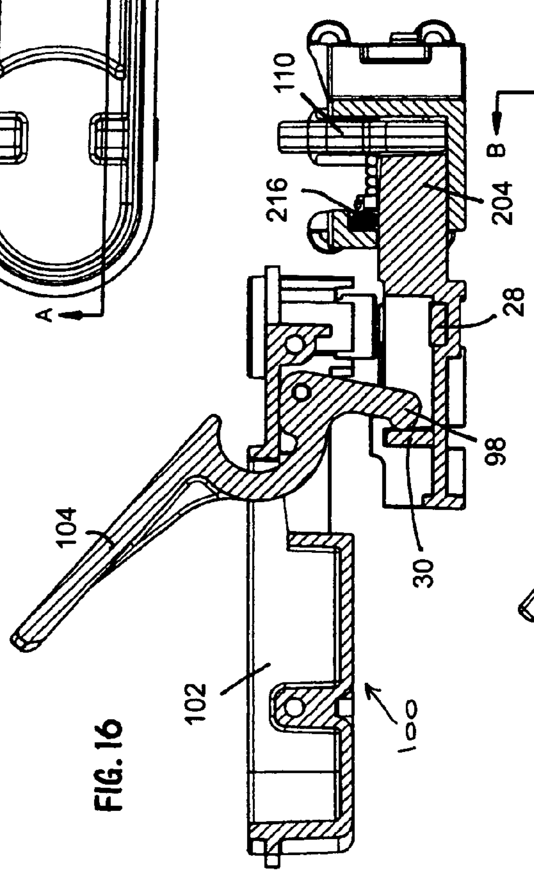
FIG. 16 is a sectional view of the latch of FIG. 15 taken along line A-A of FIG. 15.
Figure 17:
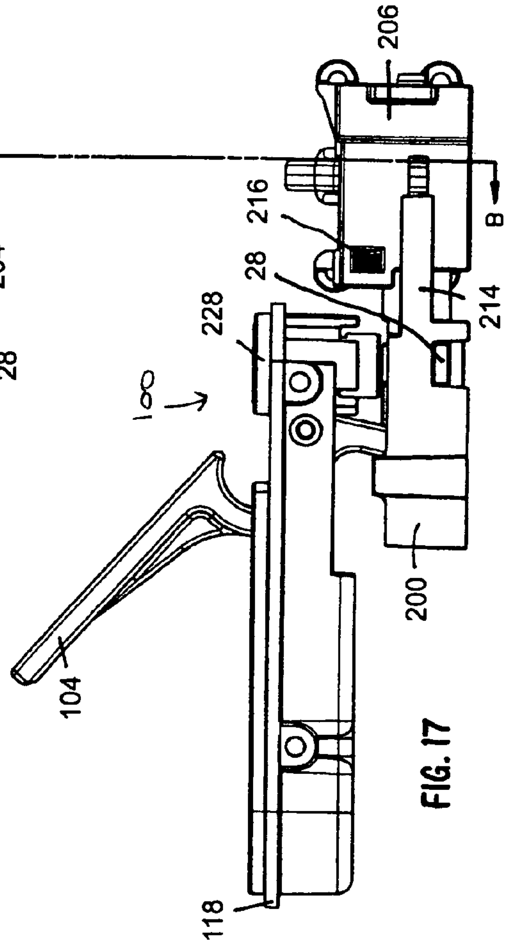
FIG. 17 is a side elevational view of the latch of FIG. 15.
Figure 19:
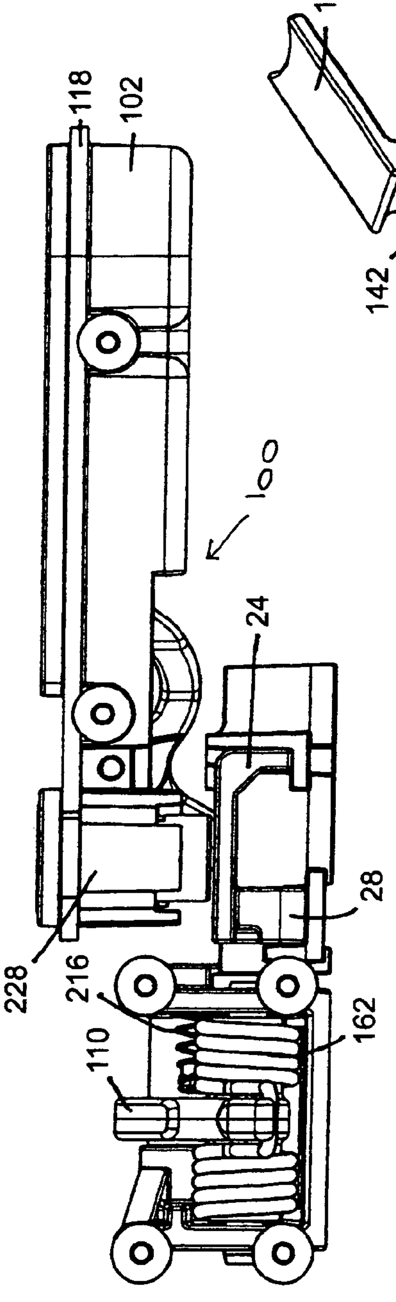
FIG. 19 is a left side elevational view of the latch of the present invention showing the latch in the latched position.

To place the latch in the unlatched position seen in FIGS. 15-18, the latch handle 104 is lifted out of the depression of the housing 102, and the handle actuator 98 extends into the interior of trigger 200 such that the handle actuator 98 slides lock slide trigger actuator 30 together with trigger 200 shown in FIG. 16 such that the pawl engaging means 204 of the trigger 200 no longer supports or engages pawl projection 156. Preferably, in the latched position, however, the pawl 110 engages pawl engaging means 204 of the trigger 200 by contact of pawl flat surface 180 on the pawl engaging means 204 as seen in FIG. 12.

Trigger 200 as seen in FIGS. 31-35 has pawl engaging means 204 which has a flat surface 205 for supporting the pawl 110 and the biasing forces acting upon the pawl 110 when the latch is in the latched position. Trigger 200 also preferably has trigger actuator slot 208 for receiving lock slide trigger actuator 30. Further, lock slide guide slot 210 is provided for receiving lock slide guide 28 when the latch is placed in the unlocked position such that the latch can be latched and unlatched. Further, trigger biasing means, preferably a conical spring, such as conical spring 216 as seen in FIG. 26 extends between trigger protuberance 212 and pawl housing wall 218. When a user desires to close a door or member configured having a striker such as striker 16 in FIG. 1, the user pushes the door closed so that striker 16 acts upon pawl 11. The conical spring 216 urges the trigger 200 due to the forces on the trigger protuberance 212 further toward the interior of pawl housing 206 such that pawl engaging means 204 slides into position below the pawl projection 156 and thereby supports pawl 110 against the biasing forces acting upon the pawl by torsion spring 162. The ability of the conical spring 216 to urge the trigger 200 into a position in which the pawl engaging means 204 supports or engages the pawl projection 156 can be seen in a comparison between FIG. 18 where the conical spring 216 has yet to slide trigger engaging means 204 underneath pawl projection 156 as compared to FIG. 12 in which pawl engaging means 204 engages the pawl 110 against the urging of pawl torsion spring 162 after the pawl has been rotated into a latched position by the application of force on striker 16 on pawl 110.

Figure 34:
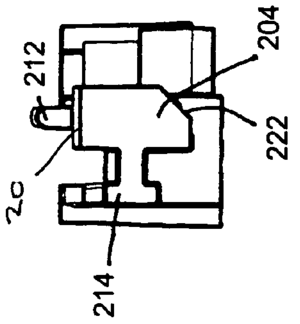
FIG. 34 is a rear view of the trigger of the latch of the present invention.
Figure 35:
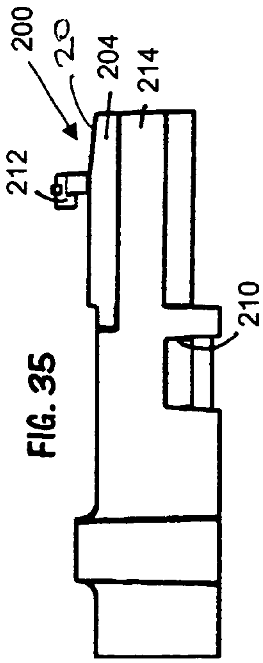
FIG. 35 is a side view of the trigger of the latch of the present invention.
Figure 36:
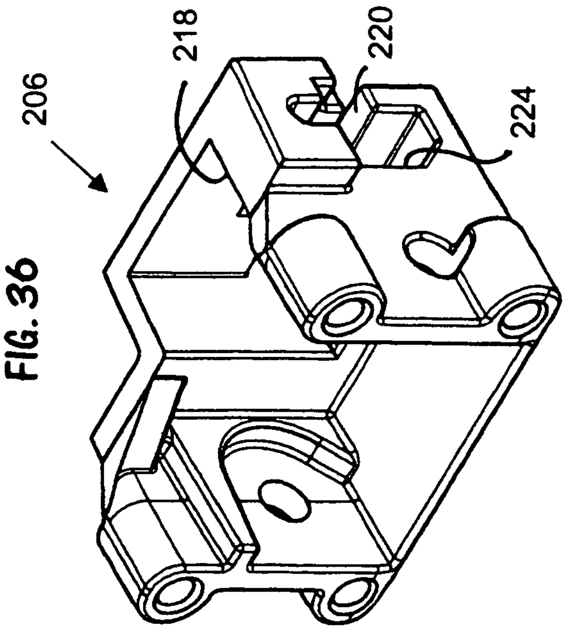
FIG. 36 is a perspective view of the pawl housing of the latch of the present invention.

Trigger 200 also has exterior guide portion 214 which extends along a portion of the major axis of the trigger 200 and the pawl housing 206 has pawl housing slot 220 which extends in the direction of the pawl engaging means 204 such that the pawl engaging means 204 of the trigger 200 is guided by the movement of the exterior guide portion 214 in pawl housing slot 220. As can be seen in FIG. 34, pawl engaging means 204 can have a beveled surface 222 on the lower bottom portion thereof which provides for ease of operation.

Figure 27:
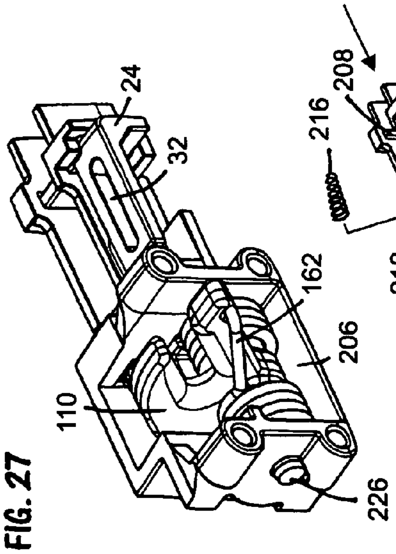
FIG. 27 is a perspective view of the assembled rotary pawl, torsion spring, lock slide and trigger of the latch of the present invention.
Figure 39:
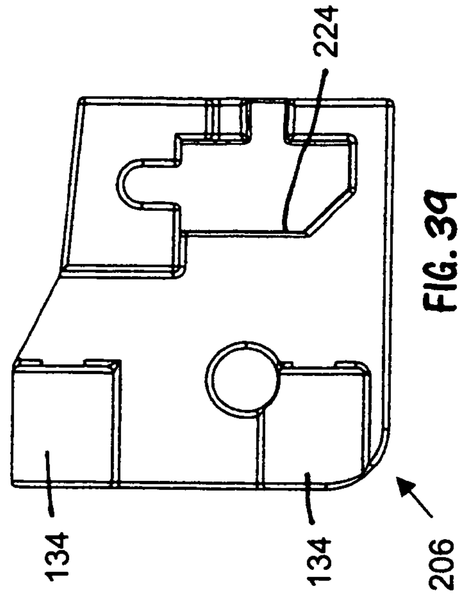
FIG. 39 is a right side view of the pawl housing of the latch of the present invention.
Figure 37:
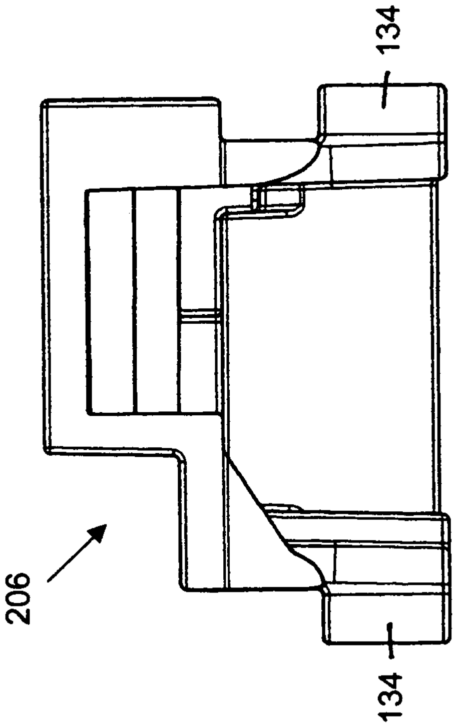
FIG. 37 is a top plan view of the pawl housing of the latch of the present invention.
Figure 38:
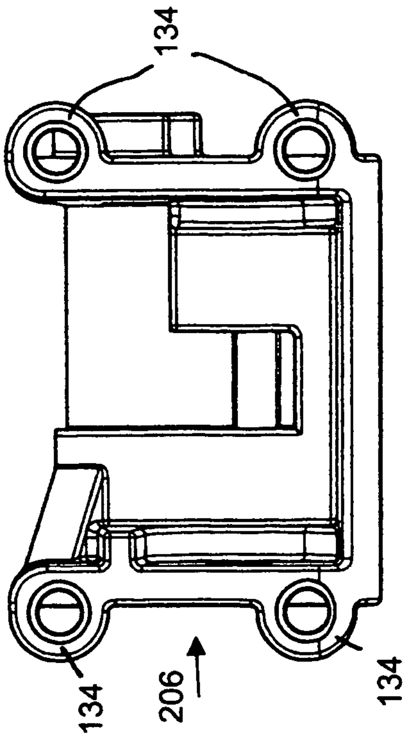
FIG. 38 is a front view of the pawl housing of the latch of the present invention.
Figure 40:
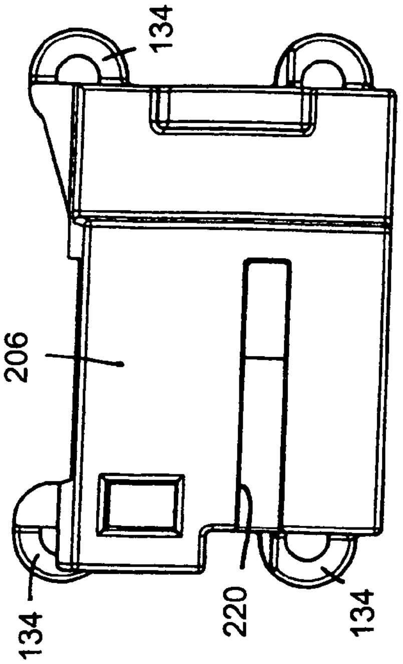
FIG. 40 is a rear side view of the pawl housing of the latch of the present invention.

In addition, in order to improve reliability of the latch and simplify assembly thereof, pawl housing 206 is provided with an aperture 224 in the shape of the side view of the trigger 200 when viewed along the longitudinal axis of trigger 200. As can be seen in FIG. 39, aperture 224 has a profile which matches the above-described side view of the trigger 200. Pawl assembly 206 is also provided with cylindrical sleeves 134 which allow for a user to fasten the pawl housing into a predetermined position on a frame or member. The lock slide 24, pawl 110, pawl torsion spring 162, trigger 200, conical spring 216 and pawl housing 206 are assembled as can be seen in the exploded view of FIG. 26. FIG. 27 shows the lock slide 24, pawl 110, pawl torsion spring 162, trigger 200 and pawl housing 206 assembled and the pawl 110 in an unlatched position. Pawl pin 226 is provided for mounting of the pawl 110 in pawl housing 206.

Figure 18:
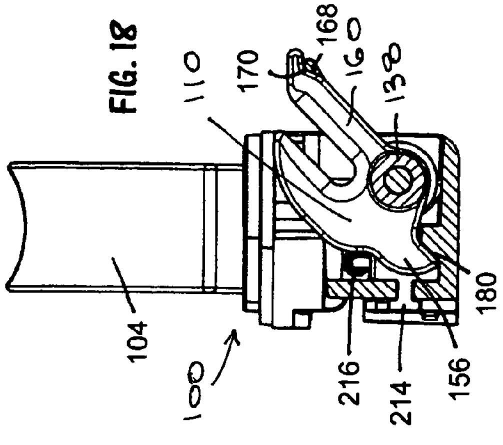
FIG. 18 is a front side elevational view partially in section of the latch of FIG. 17 showing the rotary pawl in the unlatched position.

As seen in FIG. 18 the pawl 110 has a pair of pawl pivot members 138 extending therefrom. The pawl 110 has a lug or projection 156 and is provided with a pawl slot 158 to retain the keeper member (not shown) when the pawl 110 is in the latched position. The striker 16 will be positioned or caught in the closed or latched position in pawl slot 158. The pawl 110 is also provided with an arm portion 160 extending from the pawl body.

Figure 50:
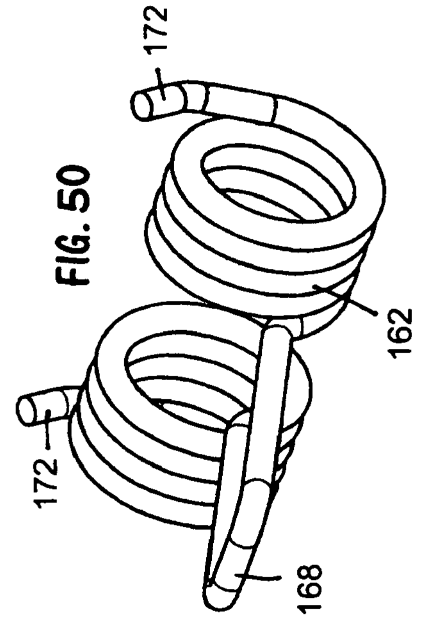
FIG. 50 is a perspective view of the torsion spring for the rotary pawl of the latch of the present invention.

A pawl torsion spring 162 seen in FIG. 50 is preferably installed on the pawl 110. Cross bar 168 of the torsion spring 162 engages the notch 170 in the arm portion 160. In the illustrated example the notch 170 more positively retains the cross bar 168 in position relative to the pawl 110. The torsion spring 162 also has tail portions 172. The projection or lug 156 has a flat surface 180 that extends roughly in a radial direction relative to the pivot axis of the pawl 110.

Figure 53:
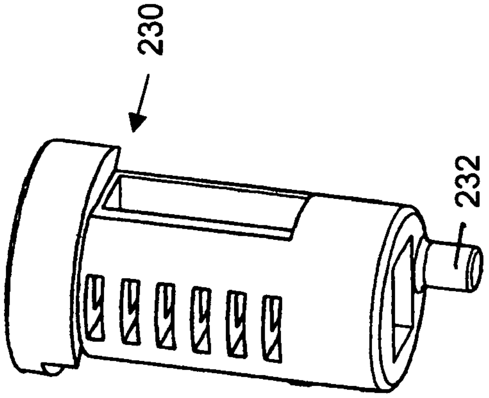
FIG. 53 is a perspective view of the rear of the lock plug of a side of the latch of the present invention.
Figure 49:
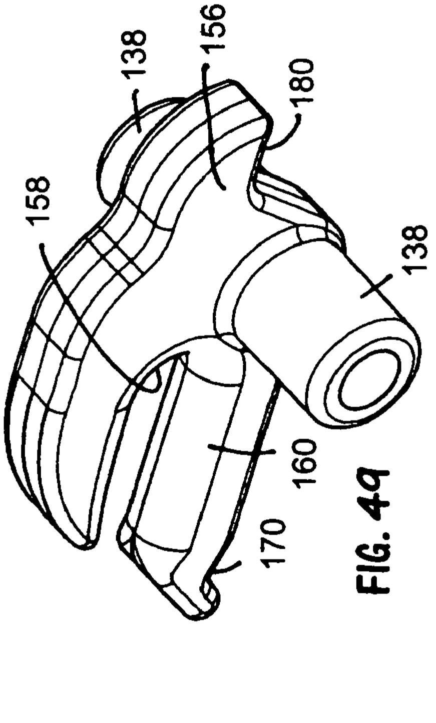
FIG. 49 is a perspective view of the rotary pawl of the present invention.
Figure 52:
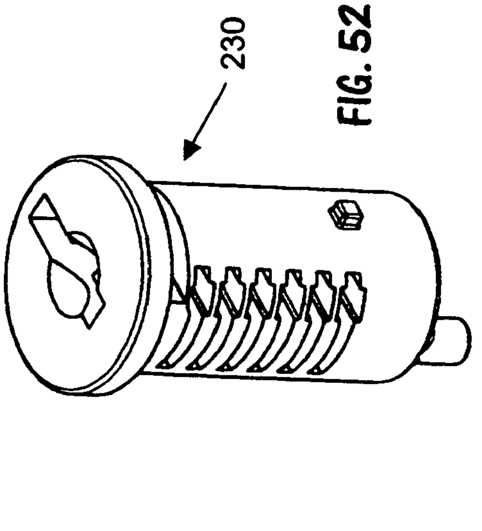
FIG. 52 is a perspective view of the front of the lock plug of a side of the latch of the present invention.

As seen in FIG. 28, the latch housing 102 can be provided with a lock cylinder 228. The lock plug shown in FIGS. 52 and 53 has a lock plug protuberance which is configured and dimensioned to fit in lock slide slot 32.

Figure 14:
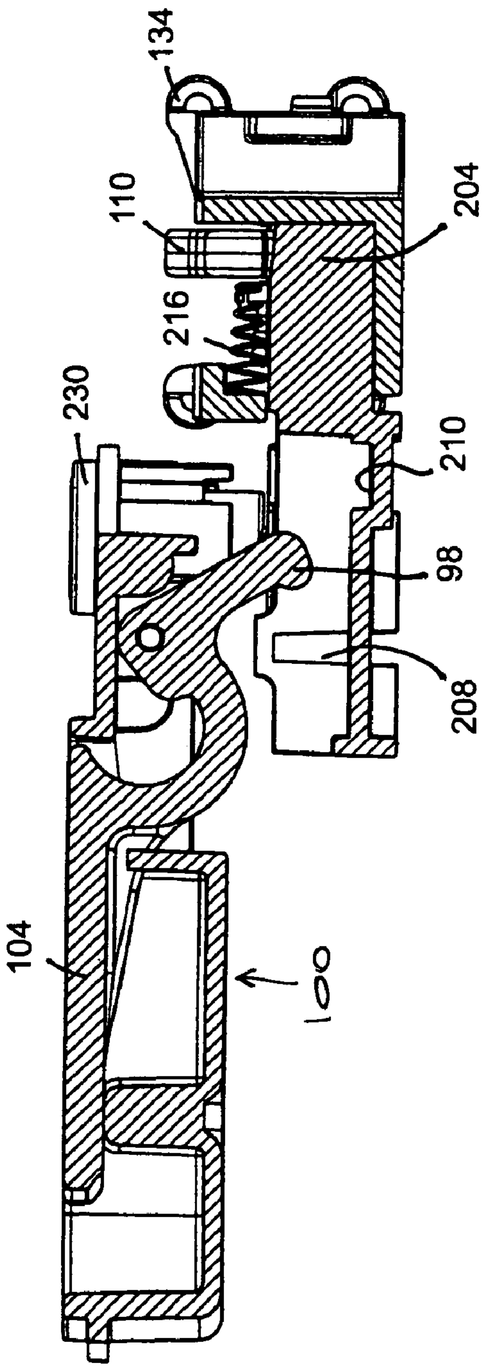
FIG. 14 is a sectional view of the latch of FIG. 13 taken along line A-A of FIG. 13 in the latched and locked position showing the lock slide trigger actuator withdrawn from the trigger slot.
Figure 13:
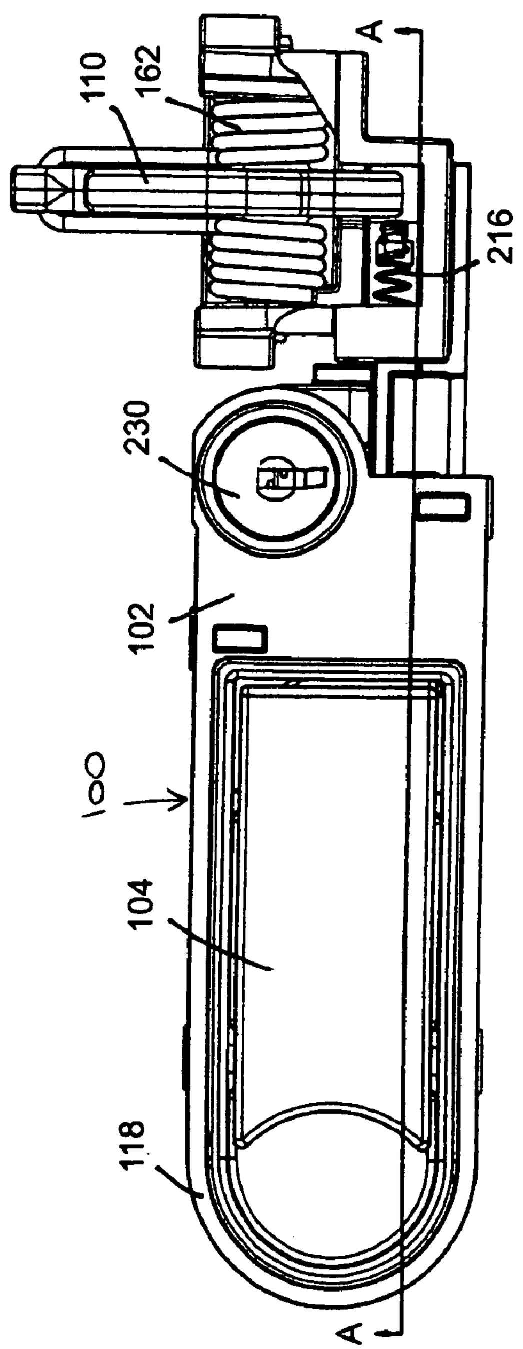
FIG. 13 is a top plan view of the latch of the present invention in the latched position showing the lock plug rotated to the locked position and the lock slide prong withdrawn to the interior of the latch housing.
Figure 15:
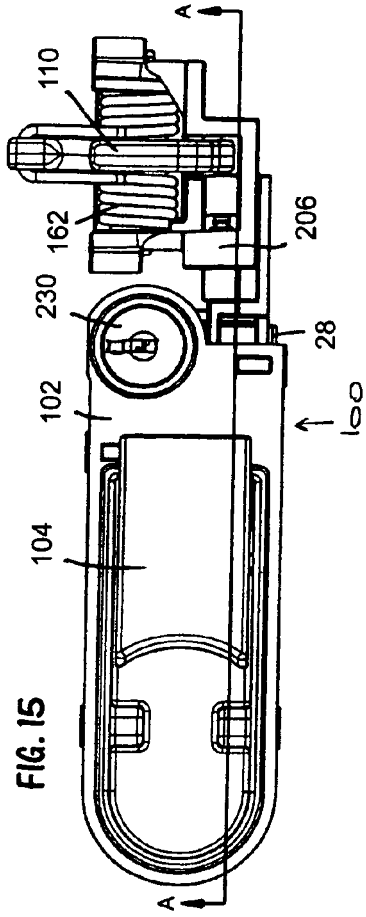
FIG. 15 is a top plan view of the latch of the present invention in the unlatched and unlocked position.
Figure 22:
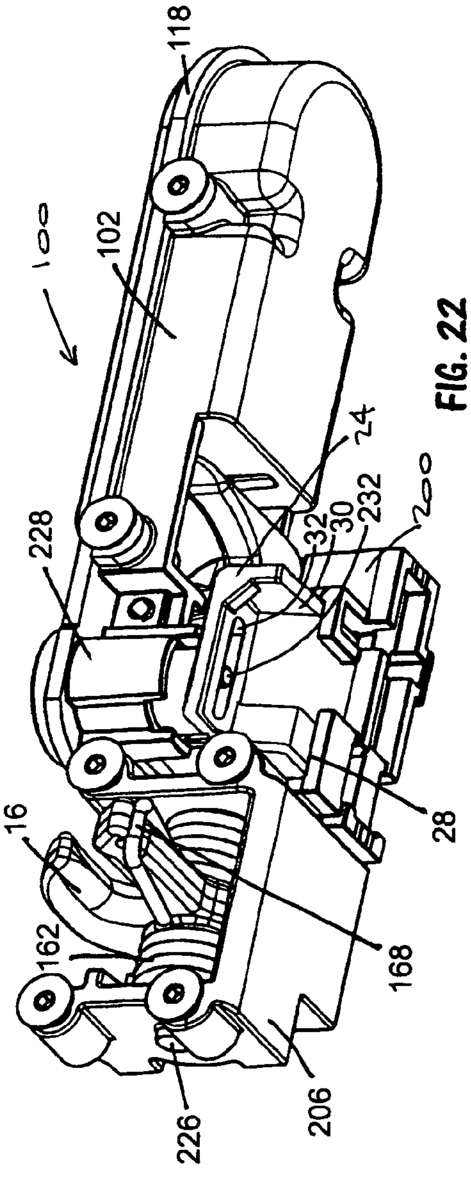
FIG. 22 is a perspective view of the bottom of the latch of the present invention in the locked and latched position after the lock plug protuberance rotates and displaces the lock slide to the locked position.
Figure 21:
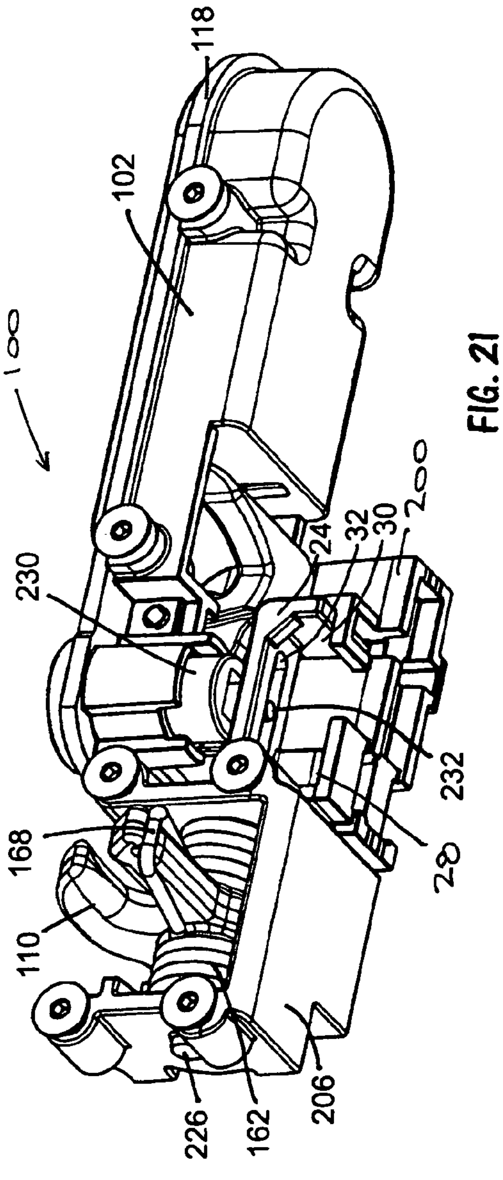
FIG. 21 is a perspective view of the bottom of the latch of the present invention in the unlocked and latched position after the lock plug protuberance displaces the lock slide to the unlocked position.

In order to unlock the latch 100 so that an authorized user can take the latch 100 from a latched and locked state to an unlocked state and then an unlatched position, reference is made by to FIGS. 21 and 22. In FIG. 22, the latch 100 is in a locked state and lock plug protuberance 232 is in lock slide slot 32 after a key (not shown), for example, has rotated lock plug 230 into the locked state. Lock slide 24 is shown in FIG. 22 withdrawn to the maximum extent possible from trigger 200. In addition, as can be seen from FIG. 22, when the latch 100 is in the locked state or position, lock slide guide 28 and lock slide trigger actuator 30 are withdrawn from the interior portion of trigger 200. As can be seen in FIG. 14, the handle 104 of the latch 100 is capable of rotation when the latch 100 is in the locked state. The handle 104 can be rotated but actuation of the trigger 200 to release the pawl 110 is not possible because rotation of the lock plug 230 and thereby the lock plug protuberance 232 has moved the lock slide 24 away from the trigger 200 such that the lock slide trigger actuator 30 is no longer positioned in the interior of the trigger 200 at a location which can be actuated by the handle actuator 98 when rotated and therefore the trigger 200 cannot be actuated by the handle actuator 98.

In FIG. 21, however, the latch is in an unlocked state as rotation of the lock plug protuberance 232 in the lock slide slot 32 has moved the lock slide 24 into a position such that the lock slide trigger actuator 30 as seen in FIG. 16 permits the handle actuator 98 to engage the lock slide trigger actuator 30. Rotation of handle 104 drives the trigger 200 away from the pawl 110 and the biasing forces of the torsion spring 162 acting upon the pawl 110 rotate the pawl 110 to an unlatched position.

When the latch is unlatched and the handle actuator 98 triggers the trigger 200, the released force of the torsion spring 162 upon the pawl 110 can provide sufficient force on the striker to partially open the door to which the striker is affixed. Thus, the user can grasp the door itself without the necessity of grasping a latch or another fastening device on the door having the striker.

Referring to FIGS. 9-18, it can readily be seen that the trigger 200 moves in rectilinear translation in a direction parallel to the pivot axis of the pawl 110 in response to pivotal movement of the handle 104 from the closed position to the open position when the pawl 110 is initially in the latched position and engaged by the trigger 200.

All of the above-described parts can be made of plastic or metal, such as stainless steel not to the exclusion of other materials.

In addition, parts of the latch which are shown as being made out of only one component can be made from multiple components.

It will be recognized by those skilled in the art that changes may be made by the above-described embodiments of the invention without departing from the broad inventive concepts thereof. For example, each of the features described above do not all need to be included in a single device. Rather, one or more features can be provided in a single device where desired and in any combination. It is understood, therefore, that this invention is not limited to the particular embodiment disclosed, but it is intended to cover all modifications which are within the scope and spirit of the invention.

What is claimed is:

1. A latch for releasably securing a member to which the latch is attached to a striker in a latched position, the latch comprising:

a latch housing adapted for being received in an aperture formed in the member;

a handle pivotally attached to said housing and movable between a closed and an open position, the handle having a handle actuator;

a pawl housing adapted for being received in an aperture formed in the member;

a pawl rotatably supported by the pawl housing so as to be movable between a latched and an unlatched position, the pawl being biased toward the unlatched position by a biasing means; and a trigger slideably displaceable in the pawl housing, the trigger having:

a pawl engaging means for engaging the pawl in an engaged position when the pawl is in the latched position, and a a trigger slot;

a trigger biasing means which is a conical spring for biasing the pawl engaging means toward the engaged position;

whereby pivotal movement of the handle from the closed to the open position when the latch is in the latched position provides for actuation of the trigger such that the pawl engaging means is slideably displaced away from the pawl and releases the pawl such that the pawl biasing means rotates the pawl to the unlatched position.

2. The latch according to claim 1 wherein the pawl biasing means is a torsion spring.

3. The latch according to claim 1 wherein the pawl has a projection for engaging the pawl engaging means of the trigger and a flat portion dimensioned and configured for engaging the striker when the striker contacts the pawl in the unlatched position.

4. The latch according to claim 1 wherein the trigger has a protuberance for mounting the conical spring, the conical spring extending between the protuberance and the pawl housing.

5. The latch according to claim 3 further comprising a handle spring which biases the handle to the closed position.

6. The latch according to claim 5 wherein the pawl engaging means has a beveled bottom portion along a major axis of the pawl engaging means thereby providing the pawl engaging means with cross-sectional profile and the pawl housing has a side for receiving the pawl engaging means which has a cutout portion which guides the pawl engaging means into and away from the engaged position.

7. The latch according to claim 6 wherein the pawl engaging means has an exterior guide portion extending along a portion of the major axis of the trigger and the pawl housing has a pawl housing slot extending in the direction of the pawl engaging means such that the pawl engaging means is guided by the movement of the exterior guide portion of the pawl engaging means in the pawl housing slot.

8. A latch for releasably securing a member to which the latch is attached to a striker in a latched position, the latch comprising:

a latch housing adapted for being received in an aperture formed in the member;

a handle pivotally attached to said housing and movable between a closed and an open position, the handle having a handle actuator;

a pawl housing adapted for being received in an aperture formed in the member;

a pawl rotatably supported by the pawl housing so as to be movable between a latched and an unlatched position, the pawl being biased toward the unlatched position by a biasing means; and a trigger slideably displaceable in the pawl housing, the trigger having:

a pawl engaging means for engaging the pawl in an engaged position when the pawl is in the latched position, and a a trigger slot;

a trigger biasing means for biasing the pawl engaging means toward the engaged position;

a rotating means in the latch housing having a rotating means protuberance, the rotating means being rotatable between a locked and an unlocked position such that the rotating means protuberance is displaced away from an axis of rotation of the rotating means during rotation;

a lock slide having a lock slide slot for receiving the rotating means protuberance, the lock slide slot extending along at least a portion of an axis of the lock slide, a lock slide trigger actuator extending from the lock slide, the lock slide being slideable between the locked and the unlocked position;

wherein the trigger slot receives the lock slide trigger actuator when the rotating means is rotated into the unlocked position such that the lock slide is displaced toward the trigger by the action of the rotating means protuberance upon the lock slide;

whereby pivotal movement of the handle from the closed to the open position when the latch is in the latched position provides for actuation of the trigger such that the pawl engaging means is slideably displaced away from the pawl and releases the pawl such that the pawl biasing means rotates the pawl to the unlatched position, and whereby in the unlocked position the pawl engaging means is displaced and the pawl is released upon action of the handle actuator upon the lock slide trigger actuator.

9. The latch of claim 8 wherein the trigger has a lock slide guide slot and the lock slide further comprises a lock slide guide which is received by the lock slide guide slot in such a manner so as to guide the sliding movement of the lock slide trigger actuator and lock slide guide relative to the trigger.

10. The latch of claim 9 wherein the rotating means is a lock plug, the rotating means protuberance is a protuberance on the lock plug, and the lock plug is rotatable between a locked position and an unlocked position.

11. The latch according to claim 10 wherein the pawl biasing means is a torsion spring.

12. The latch according to claim 11 wherein the pawl has a projection for engaging the pawl engaging means of the trigger and a flat portion dimension and configured for engaging the striker when the striker contacts the pawl in the unlatched position.

13. The latch according to claim 12 wherein the trigger biasing means is a conical spring and the trigger has a protuberance for mounting the conical spring, the conical spring extending between the protuberance and the pawl housing.

14. The latch according to claim 13 further comprising a handle spring which biases the handle to the closed position.

15. The latch according to claim 14 wherein the pawl engaging means has a beveled bottom portion along a major axis of the pawl engaging means thereby providing the pawl engaging means with cross-sectional profile and the pawl housing has a side for receiving the pawl engaging means which has a cutout portion which guides the pawl engaging means into and away from the engaged position.

16. The latch according to claim 15 wherein the pawl engaging means has an exterior guide portion extending along a portion of the major axis of the trigger and the pawl housing has a pawl housing slot extending in a direction in which the pawl engaging means extends whereby the pawl engaging means is guided by the movement of the exterior guide portion of the pawl engaging means in the pawl housing slot.

17. The latch according to claim 16 wherein the trigger is monolithic.

* * * * *